May 31, 1932.  W. S. GURTON ET AL  1,860,537
BRAKE FOR TRUCK TRAILERS
Filed March 25, 1929
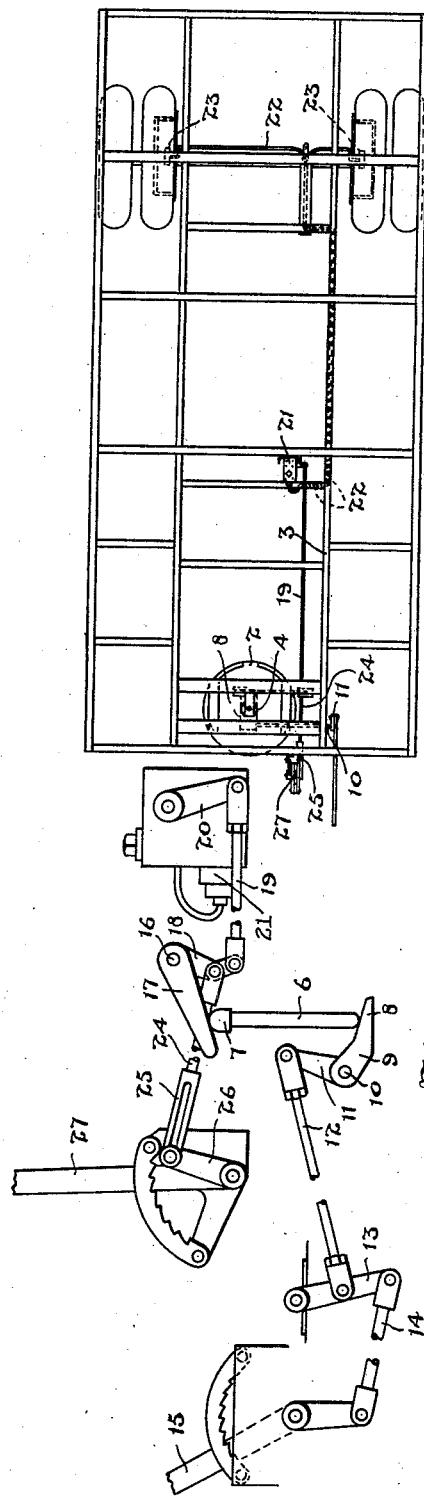
Inventors.
William S. Gurton.
Joseph Plint.
Herman Nyberg.

Patented May 31, 1932

1,860,537

UNITED STATES PATENT OFFICE

WILLIAM S. GURTON, JOSEPH PLINT, AND HERMAN NYBERG, OF KITCHENER, ONTARIO, CANADA, ASSIGNORS TO DOMINION TRUCK EQUIPMENT CO. LIMITED, OF KITCHENER, ONTARIO, CANADA

BRAKE FOR TRUCK TRAILERS

Application filed March 25, 1929. Serial No. 349,669.

The principal objects of this invention are to effect a greater factor of safety in the operation of trucks with trailers and to provide a trailer brake equipment which is operated hydraulically from the trucks.

A further and important object of the invention consists in the simplicity of construction which enables a cheap and reliable installation of brake equipment on trailers.

The principal feature of the invention consists in the novel arrangement of a hydraulic brake equipment upon the trailer, including a master cylinder, for controlling same, together with the means whereby said master cylinder can be operated effectively from the truck.

The use of a reliable braking equipment upon truck trailers is a most desirable condition and many different forms of equipment have been devised in an endeavour to supply an adequate brake control.

The present invention is applied to the semi-trailer type of truck in which the trailer member is supported at its forward end by a swivel connection on the truck or tractor.

In the accompanying drawings, Figure 1 is a side elevational view in part section showing the arrangement of brake equipment as contemplated by the present invention.

Figure 2 is a plan view of the trailer member.

Figure 3 is an enlarged diagrammatic arrangement of the preferred form of the mechanism.

In the application of the invention herein shown, the tractor or truck 1 is provided with a fifth wheel structure 2 upon which the forward end of the trailer member 3 is supported. This fifth wheel structure is provided with a central hollow hub 4.

A bearing member 5 arranged in the lower end of the hub has supported therein a vertically movable pin 6 which has, preferably, an enlarged rounded head 7.

The lower end of the pin 6 rests upon the angle-shaped arm 8 of the rocker member 9, which rocker member is mounted on a shaft 10 mounted in suitable bearings transversely arranged in the truck frame.

A crank arm 11 is mounted on the outer end of the shaft 10 and has connected thereto a rod 12 which extends forwardly alongside of the chassis of the tractor 1 and is connected to a swinging arm 13 pivotally mounted on the chassis.

The arm 13 is connected by a rod 14 to the brake lever 15 mounted in the cab of the tractor.

A shaft 16 is arranged transversely of the trailer frame and has mounted thereon an arm 17 which engages the rounded head 7 of the pin 6. The arm 17 is rigidly secured to the shaft 16 and an arm 18 also rigidly secured to the said shaft at its outer end is connected by a rod 19 to the operating lever 20 of the master cylinder 21 of the hydraulic brake.

The cylinder 21 is connected by means of the piping 22 to the brake operating cylinders 23 on the rear axle of the trailer 3.

A rod 24 is pivotally connected to the arm 18 mounted on the shaft 16 and extends forwardly therefrom and is provided with a slotted shackle end 25 which engages the crank arm 26 of a brake lever 27 mounted on the trailer frame.

The brake lever on the trailer frame is coupled with the means for operating the master cylinder 21 on the trailer so that the trailer brake may be operated when the trailer is separated from the tractor.

It will be readily understood that as the master brake cylinder for the trailer brake is mounted on the trailer frame, the mechanism for connecting the operating lever thereof through the centre of the fifth wheel is extremely simple, it is easy to install and adds very little cost to the vehicle.

The application of a reliable brake element on the pivotal trailer undoubtedly enhances the value of the whole structure as a safe transportation device.

What we claim as our invention is:

1. In a brake for truck trailers, the combination with a truck and a trailer pivotally connected thereto, of brakes on the trailer, a hydraulic cylinder mounted on the trailer connected with said brakes, said cylinder having an operating lever, mechanical means operating through the pivotal connection between said trailer and truck for actuating the operating lever of said hydraulic cylinder from the truck, and manually operable means mounted on said trailer and operatively connected with said operating lever.

2. In a brake for truck trailers, the combination with the truck having a fifth wheel thereon and a trailer pivotally connected to the fifth wheel, of hydraulic brakes arranged on the trailer, a hydraulic cylinder mounted on the trailer and connected with said brakes and having an operating arm, a rod extending from said operating arm, a lever member operatively connected to said rod, a pin centrally arranged in the fifth wheel and operating said lever, means mounted in the truck adapted to operate said pin and through said pin said brake operating lever, and means mounted on said trailer for operating said hydraulic cylinder lever independent of the aforesaid operating means.

3. In a brake for truck trailers, the combination with a truck having a fifth wheel at the rear end, and a trailer having a forward end mounted on the fifth wheel, of a pin slidably mounted centrally of the fifth wheel, means on the truck for raising and lowering said pin at will, a shaft mounted transversely of the trailer frame having an arm rigidly mounted thereon engaging the upper end of said pin, an arm rigidly secured at the outward end of the shaft, a hydraulic master brake cylinder mounted in the trailer frame, brakes for the trailer operated from said hydraulic cylinder, an operating lever for said hydraulic cylinder, a rod connecting the operating lever of the hydraulic cylinder to the arm on the outer end of said shaft, a rod pivotally connected to the arm on the outer end of the shaft and extending forwardly and having a slotted shackle on the end thereof, and a brake lever mounted on the forward end of the trailer frame operatively connected with the slotted shackle.

4. A brake for truck trailers, comprising in combination a hydraulic brake cylinder mounted on the trailer frame and having an operating member, brakes operatively connected with said cylinder, a truck connected with the trailer, mechanical means operated from the truck and extending between said truck and trailer for operating the operating member of said trailer brake cylinder to apply the brakes on the trailer, and means mounted on said trailer having a combined pivotal and slip operating connection with said mechanical means for effecting an independent operation of said trailer brake cylinder.

5. A brake for truck trailers, comprising in combination, a hydraulic brake cylinder mounted on the trailer frame having an operable portion, brakes operatively connected with said cylinder, a truck connected with said trailer, means mounted on said truck and trailer respectively adapted to be operated selectively, and mechanical means including co-operating link and lever members forming a flexible operative connection between said respective means and the operable portion of said hydraulic brake cylinder on said trailer whereby the latter may be operated independently from said truck or trailer.

6. A brake for truck trailers, comprising, in combination, a hydraulic brake cylinder mounted on the trailer frame, brakes operatively connected with said cylinder, a truck connected with said trailer, means mounted on said truck and trailer respectively adapted to be operated selectively, and mechanical means including a lost motion device interposed between one of said selectively operable means and the other of said means forming an operative connection between said respective means and the hydraulic cylinder on said trailer whereby the latter may be operated independently from said truck or trailer.

WILLIAM S. GURTON.
JOSEPH PLINT.
HERMAN NYBERG.